United States Patent [19]

Feigel et al.

[11] Patent Number: 5,043,641
[45] Date of Patent: Aug. 27, 1991

[54] CIRCUIT FOR AND METHOD OF CONTROLLING 4-PHASE BRUSHLESS DC MOTORS

[75] Inventors: Josef Feigel, Landshut; Walter Schumbrutzki, Griesbach, both of Fed. Rep. of Germany

[73] Assignee: Standard Elektrik Lorenz AG, Stuttgart, Fed. Rep. of Germany

[21] Appl. No.: 337,482

[22] Filed: Apr. 13, 1989

[30] Foreign Application Priority Data

May 21, 1988 [DE] Fed. Rep. of Germany ....... 3817423

[51] Int. Cl.[5] .............................................. H02K 29/10
[52] U.S. Cl. ..................................... 318/254; 318/138
[58] Field of Search ............................... 318/254, 136

[56] References Cited

U.S. PATENT DOCUMENTS

| | | | |
|---|---|---|---|
| 3,831,072 | 8/1974 | Tanikoshi | 318/138 |
| 4,484,115 | 11/1984 | Takahashi | 318/254 |
| 4,689,532 | 8/1987 | Howlett | 318/254 |
| 4,692,675 | 9/1987 | Falk | 318/254 |
| 4,703,235 | 10/1987 | Wisner | 318/254 |
| 4,703,236 | 10/1987 | Jansen | 318/254 |

FOREIGN PATENT DOCUMENTS 3301801 6/1987 Fed. Rep. of Germany .
3710658 10/1988 Fed. Rep. of Germany .
3710659 10/1988 Fed. Rep. of Germany .

OTHER PUBLICATIONS

Elektronik; 34 (1985) Oct., No. 22, München, DE "Bürstenloser Gleichstrommotor elektronisch angesteuert", Jerry Kmetz, pp. 92-98.
"Advanced Brushless D-C Motor Technology", from the Pittman Corp.; by Howard F. Hendricks, 1984.

Primary Examiner—Bernard Roskoski
Attorney, Agent, or Firm—Spencer & Frank

[57] ABSTRACT

A control circuit bipolarly controls the stator of a 4-phase brushless DC motor in which the staor windings are connected in a ring circuit with only four semiconductor switches. Also, two control sequences are possible: a first control sequence consisting of four switching events per revolution and number of pole pairs, in which only two semiconductor switches are activated at a time, and a second control sequence consisting of eight switching events per revolution and number of pole pairs, in which alternately two and three semiconductor switches are activated simultaneously.

10 Claims, 3 Drawing Sheets

CIRCUIT FOR AND METHOD OF CONTROLLING 4-PHASE BRUSHLESS DC MOTORS

DESCRIPTION

BACKGROUND OF THE INVENTION

The present invention relates to a circuit for and a method of controlling brushless DC motors, particularly 4-phase DC motors.

The rotating fields required to convert electrical energy into mechanical energy by means of electric motors can be produced mechanically (brushes making contact with collectors of a rotor) or electronically with the aid of semiconductor switches. U.S. Pat. No. 4,484,115 discloses a brushless DC motor having a stator which is provided with 7 phase windings and is connected in star or in a ring circuit. The rotor of the DC motor is covered with permanent magnets. The current required to produce a rotating field is controlled with the aid of semiconductor switches which are driven by signals from a rotor position sensor. Each phase winding has two semiconductor switches associated with it to permit bipolar operation.

From German Patent 33 01 801, it is known to operate a star-connected 4-phase brushless DC motor in a bipolar mode with only four semiconductor switches instead of eight semiconductor switches.

The aforementioned brushless DC motor described in the U.S. patent has the disadvantage of requiring one pair of complementary transistors for each phase winding. This is a complicated and costly solution. The brushless DC motor disclosed in German Patent 33 01 801 has the disadvantage that the stator windings are connected in star, so that the stator cannot be fully wound automatically. In addition, soldering is necessary on the coil winding heads, and the latter become relatively large in the axial direction, which results in additional electric losses.

SUMMARY OF THE INVENTION

It is an object of the invention to provide a low-cost and largely automatically produced brushless DC motor and a method of controlling the same. This object is attained by providing a DC motor characterized in that the phase windings of its armature coil are connected in a ring circuit and that each junction point between phase windings is connected to a switching element.

The brushless DC motor according to the invention has the advantage that only four semiconductor switches are required to control its four phase windings. Another advantage lies in the fact that the stator windings are connected in a ring circuit, so that the stator can be fully wound automatically. No soldering is necessary on the coil winding heads and thus, the axial dimension of the coil can be shorter than that of conventional stator coils. A further advantage is that the DC motor can be controlled with several switching sequences.

BRIEF DESCRIPTION OF THE DRAWINGS

An embodiment of the invention will now be explained in greater detail with reference to the accompanying drawings, in which.

DETAILED DESCRIPTION OF THE PREFERRED EMBODIMENT

Figure 1:
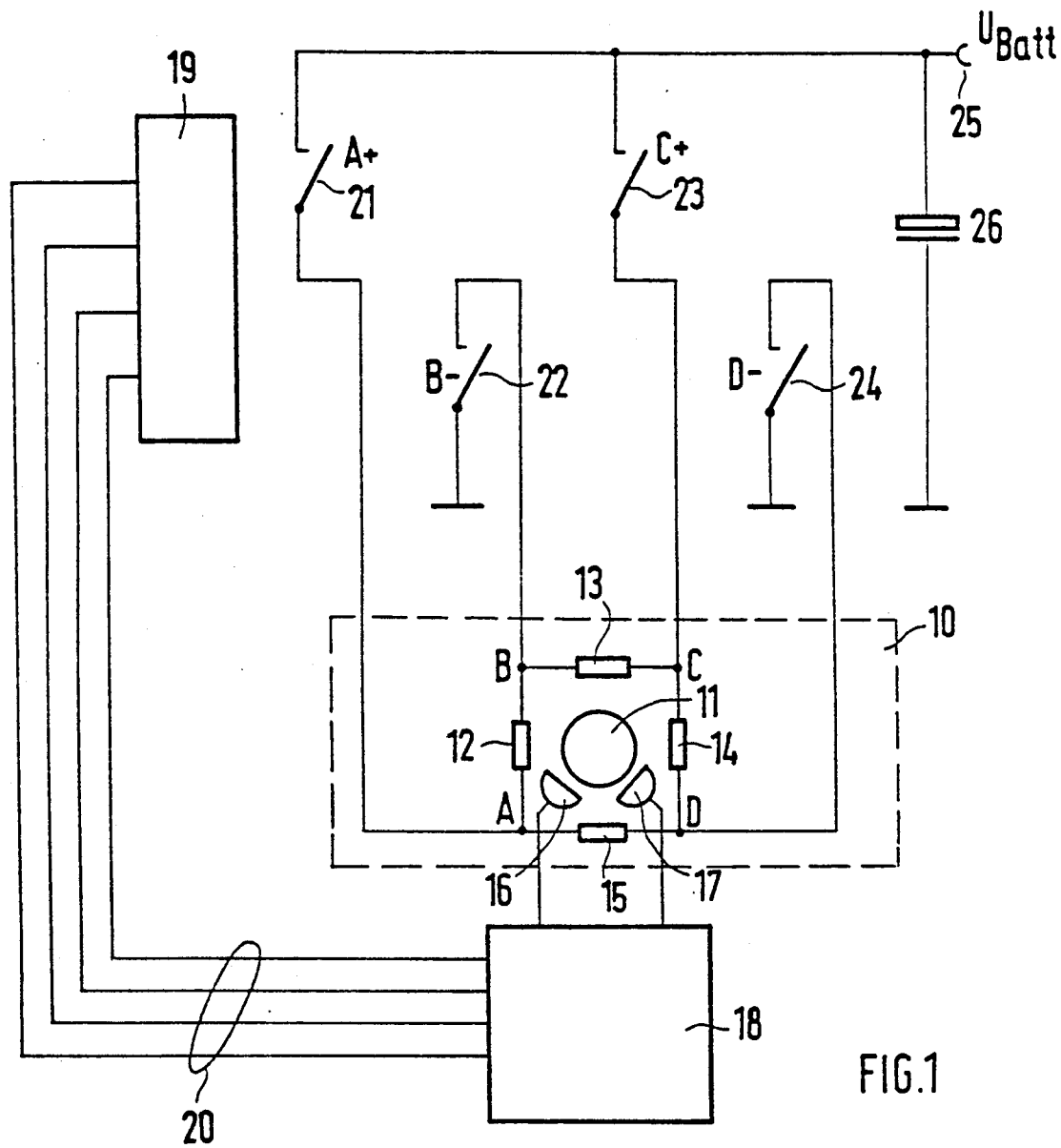
FIG. 1 is a schematic diagram of a control circuit for a 4-phase brushless DC motor in accordance with the present invention.

FIG. 1 shows the principle of a control circuit for a 4-phase brushless DC motor whose stator windings are connected in a ring circuit. A portion designated 10 contains all those elements which belong to the DC motor and not to the control circuit. The motor has a rotor 11 covered with permanent-magnet material, and a stator with four phase windings 12, 13, 14, and 15. Two magnetic sensors 16 and 17 sense the position of rotor 11. The two sensors 16 and 17 are connected to a commutation circuit 18. The output of the commutation circuit 18 is connected to a driver circuit 19 by lines 20. Two switches A+ and C+ connect the respective armature coil terminals A and C of a motor to the supply voltage. The switches B− and D− connect terminals B and D of the motor ground. The circuit includes a supply-voltage terminal 25, and a smoothing capacitor 26 which is connected between the supply-voltage terminal and ground. Switches A+, B−, C+ and D− are semiconductor power switches which may be either bipolar power transistors or MOS power transistors.

Figure 2A:
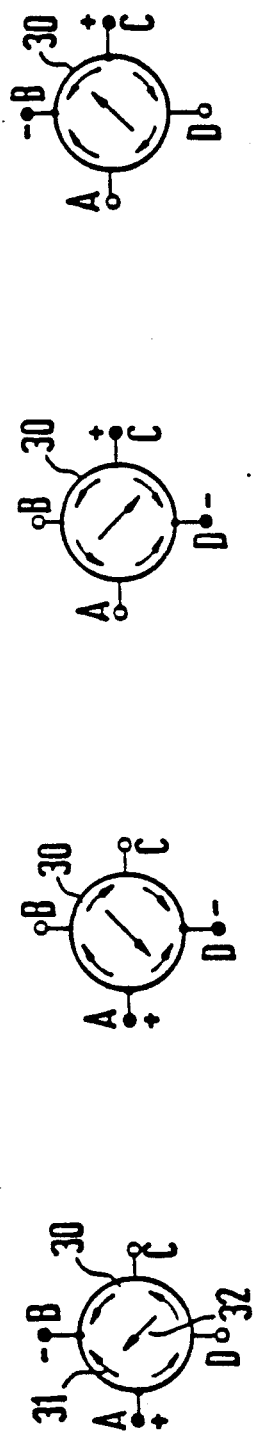
FIG. 2A shows states of the four semiconductor switches for a single commutation per revolution and number of pole pairs according to the invention.
Figure 2B:
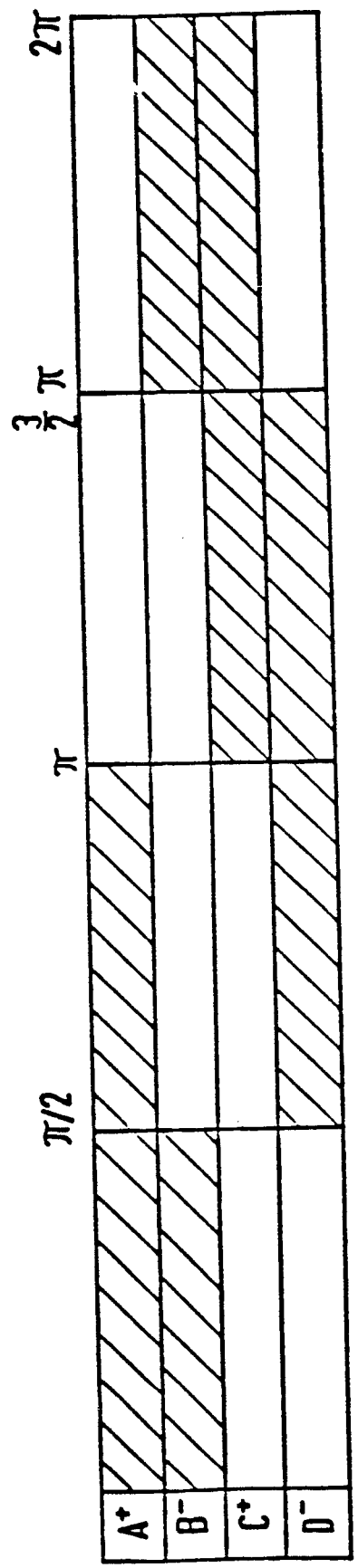
FIG. 2B illustrates the directions of current flow and positions of the flux vector in the respective states of the semiconductor switches.

FIGS. 2A and 2B serve to explain the switching sequence of the arrangement of FIG. 1, referred to as "single commutation". Each circle 30 represents schematically a stator of a brushless DC motor on which four phase windings connected in a ring circuit are wound. The points denoted by A, B, C, and D correspond to the junction points A, B, C, and D between two phase windings, as shown in FIG. 1. The arrows in the circumferential direction, designated 31, indicate the direction of current flow in the individual phase windings in the respective states of the semiconductor switches. The reference numeral 32 denotes a flux vector resulting from this current distribution. According to the invention, the phase windings are energized asymmetrically. The solid black points represent connections of the respective points A, B, C, and D to the supply voltage (+) or to ground (−).

A black point thus signifies that the associated semiconductor switch is closed. An open circle represents an open switch. Shown below the line with the motors 30 is the scheme for the switch positions over an electrical angle of 2 pi. Hatched areas indicate that the respective switch is closed within the indicated angular range. The following switching sequence is thus obtained:

First step: switches A+ and B− are closed, and switches C+ and D− are open. A series combination formed by the phase windings 13, 14, and 15 is electrically connected in parallel with the phase winding 12. The resulting magnetic flux, in conjunction with the rotor covered with permanent-magnet material, produces a torque, which causes the rotor to rotate.

Second step: switches A+ and D− are closed. The flux vector 32 rotates by 90°.

Third step: switches C+ and D− are closed, and switches A+ and B− are open. Again the flux vector 32 rotates by an angle of 90° in the mathematically positive direction.

Fourth step: switches C+ and B− are closed, and switches A+ and D− are open. After completion of the entire sequence, a new sequence begins with the first step. From the flux vectors 32 in FIG. 2B it is apparent that this switching sequence produces a rotating field which drives the rotor of the machine. The flux pattern shown refers to a two-pole machine, in which an electrical angle of 2 pi corresponds to a machine angle of 2 pi. With a greater number of pole pairs and the same control sequence, the rotor rotates by an electrical angle of 2 pi or by a solid angle of 2 pi/p, where p is the number of poles of the motor.

The arrangement of FIG. 1 can also be controlled in a different manner. A switching sequence, hereinafter referred to as "double commutation", will be described with the aid of FIGS. 3A and B. The number of schematically illustrated motors in FIG. 3B is twice that in FIG. 2B. The terminals, the current flow in the individual phase windings, and the resulting flux vector are designated by the same reference characters as in FIG. 2B. As shown in the diagram below the motors, the switching sequence is as follows:

first step: switches A+ and B− closed, switches C+ and D− open;

second step: switches A+, B−, and D− closed, switch C+ open;

third step: switches A+ and D− closed, switches C+ and B− open;

fourth step: switches A+, C+, and D− closed, switch B− open;

fifth step: switches C+ and D− closed, switches A+ and B− open;

sixth step: switches C+, B−, and D− closed, switch A+ open;

seventh step: switches C+ and B− closed, switches A+ and D− open;

eighth step: switches A+, C+, and B− closed, switch D− open.

After completion of this sequence, a new sequence begins with the first step.

Figure 3A:
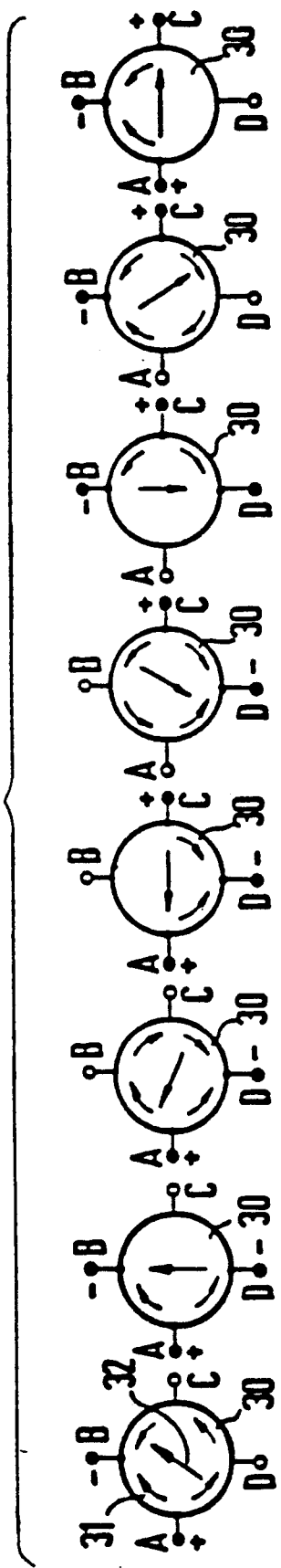
FIG. 3A shows states of the four semiconductor switches for double commutation per revolution and number of pole pairs according to the invention.
Figure 3B:
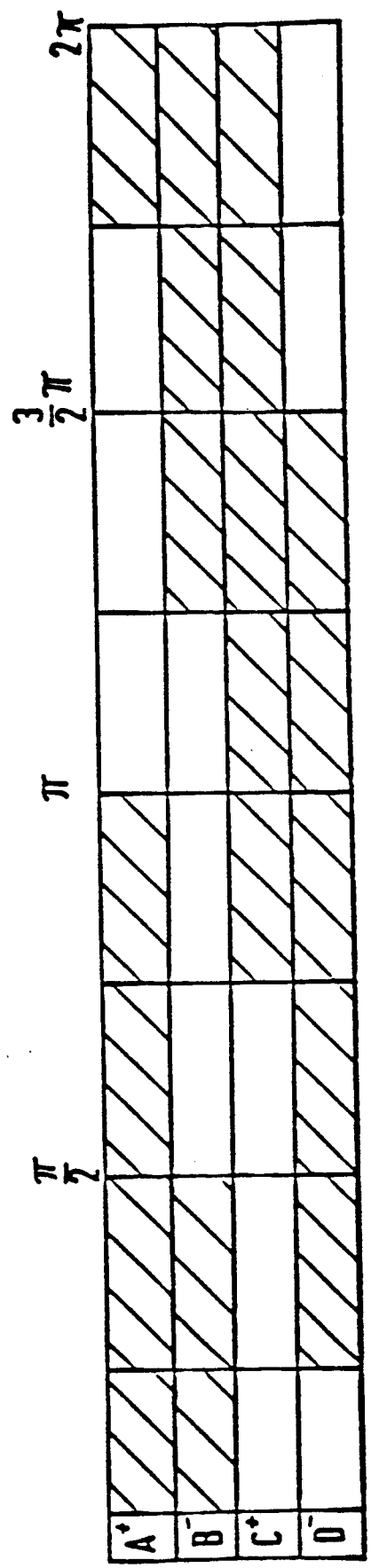
FIG. 3B illustrates the current flow direction and positions of the flux vector in respective states of the semiconductor switches as shown in FIG. 3A.

A comparison between the switching sequences described with reference to FIGS. 2A and 3A shows that in the double commutation switching sequence of FIG. 3A, there are conditions in which three switches are closed, while in the single commutation switching sequence of FIG. 2A, only two switches are closed at a time. With both switching sequences, a rotating field is produced electronically.

The design of the stator coil, the commutation logic 18, and the driver circuit 19 are not described here in detail since those features do not form part of the invention.

The control circuit and method of operating according to the invention can be employed with a stator coil, driver circuit and commutation logic which are known in the art.

We claim:

1. A control circuit for bipolar control of a four phase brushless DC motor comprising an armature coil including four phase windings mounted on a stator, a rotor having at least one pair of permanent-magnet poles and rotating relative to the armature coil, sensor means adjacent the rotor for producing signals corresponding to the rotor position, control means responsive to the signals produced by the sensor means for controlling the direction of electric current to be fed to respective ones of the four phase windings according to the polarity detected by the sensor means, and four switching elements responsive to signals generated by the control means,
   wherein said four phase windings of the armature coil are connected in a ring circuit, and each junction point between two adjacent phase windings is connected to a respective one of the four switching elements so that only four switching elements control the current being fed to the four phase windings of the circuit.

2. A control circuit as defined in claim 1, wherein two of said four switching elements connect said armature coil to a supply voltage, and the other two of said four switching elements connect said armature coil to ground.

3. A control circuit as defined in claim 1, wherein said four switching elements are semiconductor power switches.

4. A control circuit as defined in claim 2, wherein said semiconductor power switches are bipolar power transistors.

5. A control circuit as defined in claim 2, wherein said semiconductor power switches are power MOS transistors.

6. A control circuit as defined in claim 1, wherein three of the four phase windings of said armature coil are connected in parallel with the fourth phase winding when the phase windings are energized asymmetrically.

7. A control circuit as defined in claim 1, wherein said sensor means consists of two magnetic sensors connected to a commutation circuit.

8. Method of operating a control circuit for bipolar control of a four phase brushless motor comprising an armature coil including four phase windings mounted on a stator, a rotor having at least one pair of permanent-magnet poles and rotating relative to the armature coil, sensor means adjacent the rotor for producing signals corresponding to the rotor position, control means responsive to the signals produced by the sensor means for controlling the direction of electric current to be fed to respective ones of the four phase windings according to the polarity detected by the sensor means, and four switching elements responsive to signals generated by the control means, including the steps of:
   connecting said four phase windings in a ring circuit and connecting each junction point between two adjacent phase windings to a respective one of the four switching elements; and
   asymmetrically energizing the four phase windings of the armature coil.

9. A method as defined in claim 8, wherein the four switching elements of the control circuit include a first switching element connecting a first junction point of the armature coil to a supply voltage, a second switching element connecting a second junction point of armature coil to ground, a third switching element connecting a third junction point of the armature coil to the supply voltage, and a fourth switching element connecting a fourth junction point of the armature coil to ground, and further comprising the following sequential steps:

a) switching the first and second switching elements closed, and the third and fourth switching elements open;

b) switching the first and fourth switching elements closed, and the second and third switching elements open;

c) switching the third and fourth switching elements closed, and the first and second switching elements open, and d) switching the second and third switching elements closed, and the first and fourth switching elements open.

10. A method as defined in claim 8, wherein the four switching elements of the control circuit include a first switching element connecting a first junction point of the armature coil to a supply voltage, a second switching element connecting a second junction point of the armature coil to ground, a third switching element connecting a third junction point of the armature coil to the supply voltage, and a fourth switching element connecting a fourth junction point of the armature coil to ground, and further comprising the following sequential steps:

a) switching the first and second switching elements closed, and the third and fourth switching elements open;

b) switching the first, second, and fourth switching elements closed, and the third switching element open;

c) switching the first and fourth switching elements closed, and the second and third switching elements open;

d) switching the first, third, and fourth switching elements closed, and the second switching element open;

e) switching the third and fourth switching elements closed, and the first and second switching elements open;

f) switching the second, third, and fourth switching elements closed, and the first switching element open;

g) switching the second and third switching elements closed, and the first and fourth switching elements open; and h) switching the first, second, and third switching elements closed, and the fourth switching element open.

* * * * *